US006011820A

United States Patent [19]

Rosengren

[11] Patent Number: 6,011,820

[45] **Date of Patent: *Jan. 4, 2000**

[54] SINGLE FREQUENCY TRANSMISSION NETWORK

[75] Inventor: Jurgen F. Rosengren, Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,492

[22] Filed: Jul. 19, 1997

Related U.S. Application Data

[63] Continuation of application No. 08/526,676, Sep. 11, 1995, abandoned.

[30] Foreign Application Priority Data

Sep. 12, 1994 [EP] European Pat. Off. .............. 94202614

[51] Int. Cl.[7] ........................................ H04L 7/00

[52] U.S. Cl. .......................... 375/354; 375/365; 370/509; 370/514; 455/500

[58] Field of Search .................................... 375/354, 356, 375/364, 365, 369; 455/51.2, 500, 502, 507; 370/503, 507, 510, 511, 514

[56] References Cited

U.S. PATENT DOCUMENTS

| | | | |
|---|---|---|---|
| 5,327,581 | 7/1994 | Goldberg | 455/51.2 |
| 5,483,671 | 1/1996 | Helm et al. | 455/51.2 |
| 5,586,119 | 12/1996 | Scribano et al. | 370/350 |

OTHER PUBLICATIONS

"DAB–A New Sound Broadcasting System, Status of the Development, Routes to Its Introduction", by G. Plenge, EBU Review Technical, No. 246, Apr. 1991, pp. 87–112.

*Primary Examiner*—Don N. Vo
*Attorney, Agent, or Firm*—David R. Treacy

[57] ABSTRACT

A transmission network having a plurality of transmitter stations receiving signals over different transmission links from a common source. The transmitter stations transmit frames including the same data packets, substantially simultaneously over the same frequency. To ensure that the same data packets are included in each given frame, the source adds frame start codes to the signals transmitted over the links.

16 Claims, 3 Drawing Sheets

SINGLE FREQUENCY TRANSMISSION NETWORK

This is a continuation of application Ser. No. 08/526,676, filed Sep. 11, 1995 which is now abandoned.

BACKGROUND OF THE INVENTION

The invention is related to a transmitter network comprising a source station for transmitting a signal via at least two transmission links to at least two transmitter stations, said transmitter stations comprising a receiver for receiving said signal from said source station and a radio transmitter for transmitting said signal on a carrier.

The invention is also related to a source station and a transmitter station for use in such a transmission network, and to a method of transmitting a signal.

A transmitter network according to the preamble is known from "DAB- A new sound broadcasting system, Status of the development, Routes to its introduction", by G. Plenge in EBU review technical, No. 246, April 1991,pp. 87–112.

When a conventional transmitter network is designed, for example, for broadcasting purposes, one is generally confronted with the problem that not enough channels are available for the signals to be transmitted. In that case one resorts to reusing frequencies and arranging the tramsmitters such that under normal propagation conditions it is possible to receive in a certain area only one of the transmitters transmitting at a specific frequency, so that no mutual interference need be expected under normal propagation conditions. In such a conventional transmitter network, however, interference may nevertheless occur under special propagation conditions, such as, for example, tropospheric ducting.

In the transmitter network known from the above mentioned article, a signal is transmitted with a like transmitter frequency via a plurality of transmitters, whereas a receiver can receive signals from different transmitters. As a result, a disturbance signal is developed having a characteristic corresponding to an echo signal. This (undesired) echo signal is suppressed in the receiver by means of an echo canceller or by using what is commonly referred to as a guard band in the time domain when the signal to be transmitted is actually transmitted. Consequently, it is possible that this received signal is discarded in the receiver for a specific period of time during which the received signal is disturbed by the echo signals.

A great advantage of transmitter networks, in which no more than a single transmitter frequency is used, is that much fewer channels need to be available than when conventional transmitter networks are used. In addition, in transmitter networks employing no more than a single transmitter frequency, there will be no additional disturbance even under special propagation conditions, because such disturbing signals are already taken into account in the receivers.

If the instant of transmission of a predetermined part of the signal differs too much between two transmitter stations, said echo delay can be rather long. This delay difference may be caused by delay differences of the transmission paths between the source station and the transmitter stations. As a result of these relatively large delay differences, the measures to be taken in the receivers for cancelling the effect of the echo signals are rather complex.

The signal to be transmitted by the transmit station can be in the form of a frame, comprising the useful data, a number of training sequences and/or sync symbols and sometimes stuffing symbols. The useful data can be supplied by the network consisting of transmission links. Such network often uses transport frame structures, in which the symbols to be transported have to be mapped. This mapping can be different for different transmission links. This may result in transmission of different symbols by the transmitter stations at a given instant, leading to a failure of the transmitter network.

SUMMARY OF THE INVENTION

The object of the present invention is to provide a transmitter network according to the preamble in which it is assured that all transmitter stations transmit the same symbols at the same instant.

Therefor the invention is characterised in that said transmitter stations comprise conversion means for converting the signal in a further signal comprising frames of digital symbols, and in that the source station comprises determining means for determining the parts of the signal to be transmitted by the transmitter station in one frame, and means for transmitting an identification of said parts to said transmitter stations.

By indicating which symbols should be transmitted in one frame, by sending a corresponding identification with the data signal it can be assured that the same symbols are transmitted in each frame by the transmitter stations. Said identification can e.g. be a frame start code indicating that the symbols between a present start code and the next frame start code should be transmitted in one frame. Thus the frame start codes indicate the beginning of a sequence of parts of the data signal which are determined to form a respective frame.

It is observed that the invention also may be used for diversity transmission, in which a like frequency for the transmitters is not required.

An embodiment of the invention is characterised in that the determining means comprise further conversion means being equivalent to the conversion means.

By introducing the conversion means also in the source station, said source station can easily determine which symbols can be transmitted in one frame. This can be done by assembling the frame from the signal to be transmitted, and by transmitting frame start codes at the beginning of each frames together with the data to be transmitted (not the remaining part of the frame) via the transmission link to the transmitter stations.

The invention will be further explained with reference to the drawings.

DESCRIPTION OF THE PREFERRED EMBODIMENTS

Figure 1:
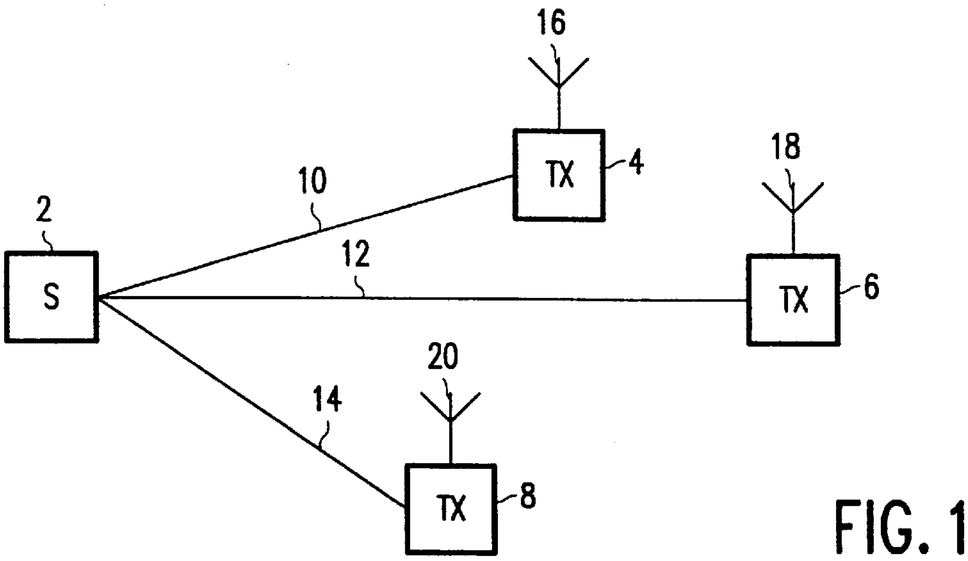
FIG. 1, a single frequency transmitter network in which the invention can be used.

In the transmitter network according to FIG. 1 a source station 2 is coupled via respective transmission links 10, 12, and 14 to respective transmission stations 4,6 and 8. Each of the transmission stations 4, 6 and 8 constructs a transmission frame including the data received from the corresponding transmission link 10, 12 or 14. It is ensured that the sum of the delay of the signal in the transmission link and the delay in the transmitter station is substantially the same for all transmission stations 4,6, and 8. This results in a substantially simultaneous transmission of the signal by all transmitter stations.

Figure 2:
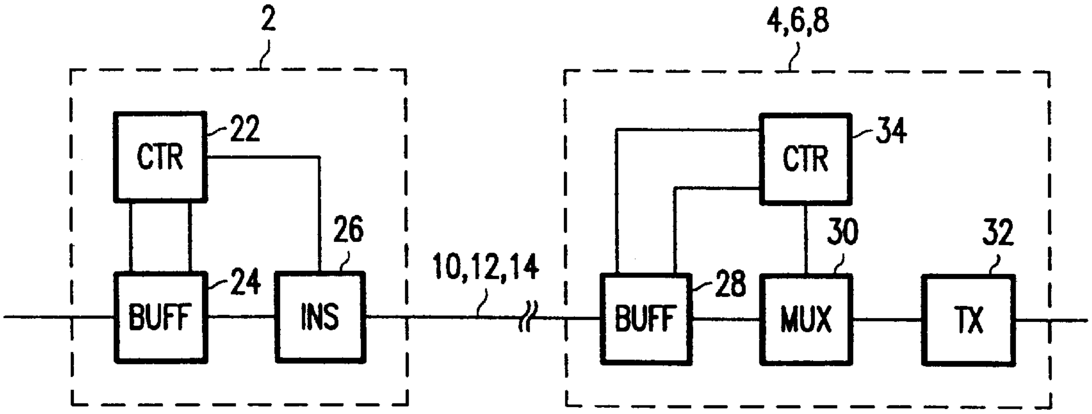
FIG. 2, a simplified block diagram of the transmitter network according to FIG. 1.

In the block diagram according to FIG. 2 the signal is applied to an input of a buffer 24, The buffer 24 is coupled to a control circuit 22. The output of the buffer 24 is connected to an input of a insertion device 26 for inserting information identifying which parts of the signal have to be transmitted in one frame. The insertion of said information is controlled by the control circuit 22. The output of said insertion device is coupled via a transmission link 10, 12 or 14 to the corresponding transmitter station 4,6 or 8. The input signal of said transmitter station 4,6, or 8 is applied to a buffer 28. Said buffer 28 is coupled to a control circuit 34. The output of the buffer is connected to an input of a multiplexer 30. An output of the control circuit 34 is connected to a control input of the multiplexer 30. The output of the multiplexer is connected to an input of a transmitter 32, and the output of the transmitter 32 is coupled to the corresponding antenna 16, 18 or 20.

In the discussions below it is assumed that the signal is a digital signal comprising packets of digital symbols. Said packets are temporarily stored in the buffer 22. The control circuit 22 determines which packets can be transmitted by the transmitter stations 4,6,8 in one frame. The insertion device 26 inserts a so called frame start code indicating that the first packet transmitted after the frame start code is the first packet to be transmitted in a new frame by the transmitter station. In this way it is indicated that the packets present between two subsequent frame start codes are to be transmitted in one frame.

In the buffer 28 the packets received from the source station are temporarily stored, and the frame start codes are removed and applied to the control circuit 34. Said control circuit 34 controls the buffer 28 and the multiplexer 30 to construct the final transmission frame by combining the packets belonging to said frame with the packet overhead signals. Because the source station uses a model of the transmission frame construction process in the transmitter station, when the source station inserts the frame start codes, it is ensured that the packets between two frame start codes always can be transmitted in one frame. The overhead signals can comprise frame synchronisation signals, clock run in signals and training signals for the receivers intended for receiving signals from the transmission network. The complete frame is available at the output of the multiplexer 30. Said output signal is modulated on a carrier and amplified in the transmitter 32 before it is applied to the corresponding transmitting antenna 16, 18 or 20.

Figure 3:
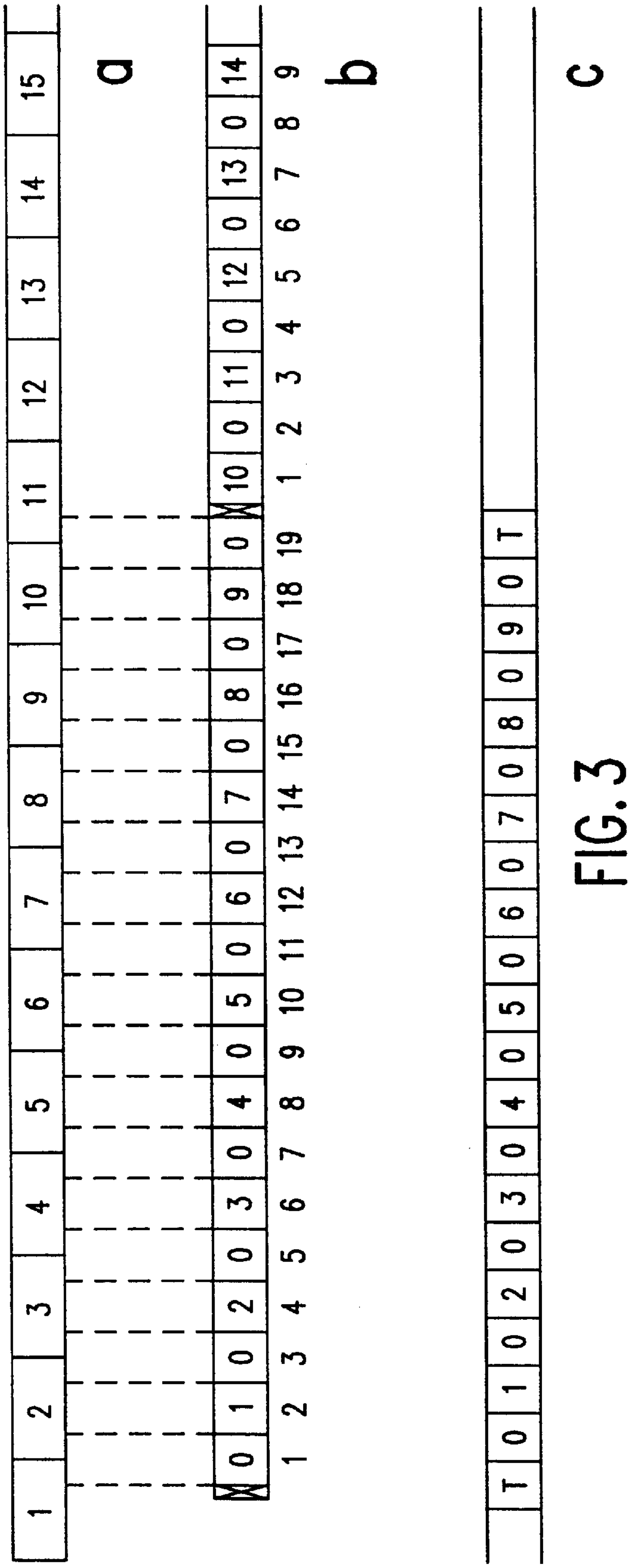
FIG. 3, the construction of the signals present in the network according to FIG. 2.

In FIG. 3 graph a, the signal at the input of the buffer 24 in FIG. 2 is shown. It comprises subsequent packets which are numbered 1 to 15. In FIG. 3 graph b the signal transmitted via the transmission links is displayed. Said signal comprises the frame start codes and a plurality of time slots for transmission of the packets. The time slot number is indicated below the corresponding time slot. The signal transmitted via the transmission links is constructed by adding behind a frame start code the packets available in the time slots 1–19.

If at the beginning of a new time slot a complete packet is available in the buffer 24, said packet is transmitted in said time slot. Also the slot number is introduced in the signal transmitted in said slot. If no complete packet is available a stuff or null symbol is transmitted in the corresponding slot. The number of time slots has at least to be equal to the maximum number of packets which fit in a transmission frame. In general said number of time slots is somewhat larger to provide some stuffing capability.

In FIG. 3, graph c the transmission frame as finally transmitted by the transmitter station is displayed. It comprises a header T which comprises all frame overhead signals, followed by the data packets. The frame comprises the packets to be transmitted and a number of stuffing symbols. It is observed that it is possible that the number of time slots in the signals transmitted via the transmission links is different from the number of packets transmitted in a transmission frame. It is also possible that the signals on the transmission links do not comprise stuff packets in order to reduce the required transmission capacity.

Figure 4:
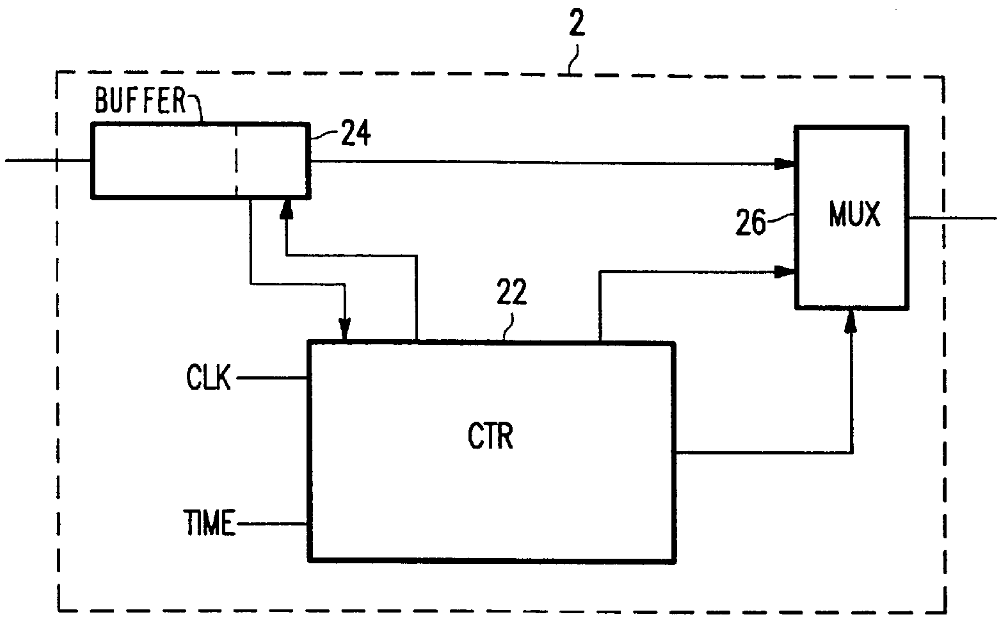
FIG. 4, a more detailed drawing of a source station for use in a transmitter network according to FIG. 1.

In the source station according to FIG. 4, the input symbols are applied to an input of a buffer 24. A first output of the buffer 24 is connected to an input of a multiplexer 26. A second output of the buffer 24, carrying an output signal indicating whether or not there is a complete packet available in the buffer 24, is connected to an input of a control circuit 22. A first output of the control circuit, carrying a read control signal, is connected to a read input of the buffer 24.

A second output of the control circuit 22, carrying the frame star code, is connected to a second input of the multiplexer 26. A third output of the control circuit 22, carrying a multiplexer control signal, is connected to a control input of the multiplexer 26. A clock signal CLK, and an absolute time reference TIME ate applied to the control circuit 22.

The multiplexer 26 transforms the signal according to FIG. 3 graph a into the signal according to FIG. 3, graph b. This is done by multiplexing the output signal of the buffer 24 with the frame start code. At the beginning of a frame the frame start code is output by the multiplexer 26. After having output the frame start code, the control circuit 22 checks whether there is a complete packet available in the buffer 24. If such a complete packet is available, the control circuit 22 issues a read signal on its read signal output, causing the buffer 24 to output said packet. In the multiplexer 26 the time slot number is added to the packet being output by the buffer 24. If no complete packet is available a so called null packet or stuff packet is transmitted.

The frame can also contain information about the instant on which said frame was transmitted. This information can be used in the transmitter stations to calculate the transmission delay of the transmission link, in order to be able to add a predetermined delay value to obtain substantially simultaneously transmission of the digital symbols by the transmitter stations. The absolute timing reference can be obtained from a high precision clock, but it is also possible to obtain said absolute timing reference from the Global Positioning System ( GPS-Navstar ) by using rather cheap receivers.

Figure 5:
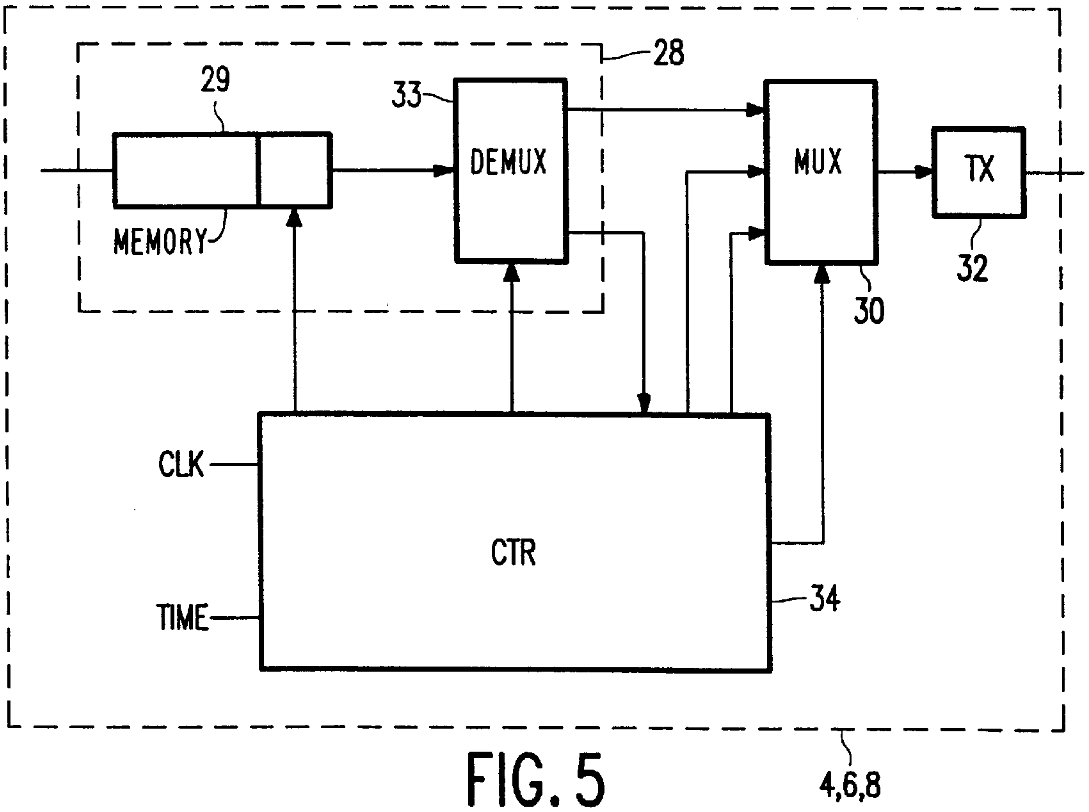
FIG. 5, a more detailed drawing of a transmitter station for use in a transmitter network according to FIG. 1.

In the transmitter station according to FIG. 5, a signal received from a transmission link is applied to the buffer 28. The buffer 28 comprises a buffer memory 29 having its output connected to a demultiplexer 33. A first output of the demultiplexer 33, carrying the time slot number is connected to an input of the control circuit 34. A second output of the demultiplexer 33, carrying the packets to be transmitted is connected to a first input of a multiplexer 30. A first output of the control circuit 34 is connected to a control input of the buffer memory 29. A second control output of the control circuit 34 is connected to a control input of the multiplexer 33. A third output of the control circuit 34, carrying stuff packets, is connected to a second input of the multiplexer 30. A fourth output of the control circuit 34, carrying a frame overhead signal is connected to a third input of the multiplexer 30. A fifth output of the control circuit 34 is coupled to a control input of the multiplexer 30. The output of the multiplexer 30 is connected to an input of a transmitter 32. The output of the transmitter 32 is coupled to the corresponding antenna.

The signals received from the transmission link is temporarily stored in the buffer memory 29. At the beginning of a new frame which is indicated by the frame start code, the frame overhead signal is selected and passed to the transmitter 32 by the multiplexer 30. After the frame overhead signal the data packets and stuff packets are transmitted. The control circuit 34 checks the slot number of the first packet in the buffer memory 29. If said slot number corresponds to the number of the packet to be transmitted, the packet in the buffer memory 29 is transmitted. Otherwise it means that no data packet is present in the buffer memory 29, and consequently a stuff packet is transmitted. This is repeated until the last packet in a frame is transmitted. The last packet of a frame is indicated by the frame start code of the subsequent frame. The frames assembled in this way are modulated on a carrier by the transmitter 32 and applied to the corresponding antenna for transmission. The above mentioned construction of the transmitter station can also be used if no stuff packets are present in the signal received from the respective transmission link. The decision whether or not a stuff packet should be introduced can be decided on the presence of the correct time slot number in the packet.

If the signal received from the transmission links also comprises information about the actual time of transmission, this time of transmission can be used for adjusting the delay value of a delay element in order to obtain substantially simultaneously transmission by the same information by the different transmitter stations. Therefor an absolute time reference TIME is applied to the control circuit 34.

I claim:

1. A transmitter network comprising a source station for transmitting a data signal via at least two transmission links to at least two transmitter stations, each transmitter station comprising a receiver for receiving said data signal from said source station and a radio transmitter for transmitting said data signal on a carrier, characterized in that each of said transmitter stations comprises respective conversion means for converting the data signal into a further signal comprising frames of digital symbols, the source station comprises determining means for determining the parts of the data signal to be transmitted by each of the transmitter stations in one frame, said parts of the data signal being a sequence, and means for adding solely a frame start code to each sequence of parts of the data signal which are determined to form a respective frame to identify the start of the respective frame.

2. A network as claimed in claim 1, characterized in that, for determining the parts of the signal to be transmitted by each of the transmitter stations in one frame, the source station uses a model of the transmission frame construction process in the transmitter stations.

3. A network as claimed in claim 1, characterized in that each transmitter station comprises means for providing and inserting a respective header including all frame overhead signals at the beginning of each frame to be transmitted.

4. A network as claimed in claim 1, characterized in that the source station comprises means to introduce a timing symbol dependent on the transmission time of said signal.

5. A transmitter network comprising a source station for transmitting a signal comprising data packets of digital symbols via at least two transmission links to at least two transmitter stations, each transmitter station comprising a receiver for receiving said signal from said source station and a radio transmitter for transmitting said signal on a carrier, characterized in that:

each of said transmitter stations comprises respective conversion means for converting the signal into a further signal comprising frames of digital symbols, the source station comprises determining means for determining the data packets to be transmitted by each of the transmitter stations in one frame, said data packets to be transmitted in one frame being a sequence, and means for adding a frame start code to each sequence of data packets which are determined to form a respective frame to identify the start of the respective frame, each sequence of data packets transmitted over said transmission links is divided into a number of time slots, the source station includes means for inserting a slot number into each time slot, and a first number of stuff packets into a given sequence of data packets which are determined to form a respective frame, and each transmitter station comprises a buffer memory for storing received data packets and the respective slot numbers corresponding to the stored data packets, means for comparing the slot number of the first packet in the buffer memory with the number of a packet to be transmitted, and means for inserting a stuff packet when the slot number and the number of the packet do not correspond.

6. A network as claimed in claim 5, characterized in that the source station comprises means to introduce a timing symbol dependent on the transmission time of said signal.

7. A source station for transmitting a signal via at least two transmission links to a plurality of transmitter stations for substantially simultaneous retransmission of the signal, characterized in that:

the source station comprises determining means for determining the parts of the signal to be transmitted by each of the transmitter stations in one frame, and means for adding a frame start code to each sequence of parts of the data signal which are determined to form a respective frame to identify the start of the respective frame, and the signal transmitted by the source station does not include frame overhead signals other than said frame start code.

8. A source station as claimed in claim 7, characterized in that, for determining the parts of the signal to be transmitted by each of the transmitter stations in one frame, the source station uses a model of the transmission frame construction process in the transmitter stations.

9. A source station as claimed in claim 7, wherein said signal comprises data packets of digital symbols, characterized in that each sequence of parts of the data signal which are determined to form a respective frame transmitted over said transmission links is divided into a number of time slots, said parts of the signal are data packets, and the source station includes means for inserting a slot number into each time slot, and a first number of stuff packets into a given sequence of data packets which are determined to form a respective frame.

10. A source station as claimed in claim 9, characterized in that the source station comprises means to introduce a timing symbol dependent on the transmission time of said signal.

11. A source station as claimed in claim 7, characterized in that the source station comprises means to introduce a timing symbol dependent on the transmission time of said signal.

12. A transmitter station for a multitransmitter network, comprising a receiver for receiving a signal via a transmission link from a source station, and a radio transmitter for transmitting said signal on a carrier, wherein said signal includes a multiplicity of time slots and a plurality of spaced frame start codes identifying the start of respective sequences of parts of the signal which are to form respective frames, and said signal is free from frame overhead signals other than said frame start codes, characterized in that said transmitter station comprises conversion means responsive to said frame start codes for converting the signal into a further signal comprising frames of digital symbols.

13. A station as claimed in claim 12, further comprising means for providing and inserting a respective header including all frame overhead signals at the beginning of each frame to be transmitted.

14. A station as claimed in claim 13, further comprising a buffer memory for storing received data packets and respective slot numbers corresponding to the stored data packets, means for comparing the slot number of the first packet in the buffer memory with the number of a packet to be transmitted, and means for inserting a stuff packet when the slot number and the number of the packet do not correspond.

15. A method of transmitting a signal over a multitransmitter network, comprising:

transmitting a signal from a source station via at least two transmission links to a plurality of transmitter stations, receiving said signal at each transmitter station, and transmitting said signal on a respective carrier from each transmitter station, characterized in the method further comprises:

based on predetermined signal converting characteristics of said transmitter stations, determining at said source station a division of said signal into a sequence of frames, transmitting a frame start code over said transmission links at the start of each sequence of parts of the data signal which are determined to form a respective frame, each frame being free from frame overhead signals other than said frame start code, and converting the signal in each transmitter station into a further signal comprising frames of digital symbols.

16. A method as claimed in claim 15, further comprising:

in each transmitter station, providing and inserting a respective header including all frame overhead signals at the beginning of each frame to be transmitted.

* * * * *